United States Patent [19]

Burge et al.

[11] Patent Number: 5,453,123
[45] Date of Patent: Sep. 26, 1995

[54] THIXOTROPING AND SET-ACCELERATING ADDITIVE FOR MIXTURES CONTAINING A HYDRAULIC BINDER, PROCESS USING THE ADDITIVE, APPARATUS FOR PREPARING THE MIXTURES CONTAINING A HYDRAULIC BINDER AS WELL AS THE ADDITIVE

[75] Inventors: Theodor A. Burge, Geroldswil; Urs Mader, Frauenfeld; Ueli Sulser, Oberengstringen; Franz Wombacher, Zurich, all of Switzerland

[73] Assignee: Sika AG, vorm. Kaspar Winkler & Co., Switzerland

[21] Appl. No.: 167,017

[22] Filed: Dec. 16, 1993

[30] Foreign Application Priority Data

Dec. 16, 1992 [CH] Switzerland .................... 3838/92

[51] Int. Cl.⁶ ........................................... C04B 24/04
[52] U.S. Cl. ............... 106/708; 106/724; 106/726; 106/727; 106/728; 106/790; 106/808; 106/809; 106/810; 106/823
[58] Field of Search ................. 106/705, 708, 106/724, 725, 727, 728, 790, 802, 808, 809, 810, 822, 823, 819, 735, 726

[56] References Cited

U.S. PATENT DOCUMENTS

| 3,672,173 | 6/1972 | Paramore et al. . | |
|---|---|---|---|
| 3,819,389 | 6/1974 | Uchikawa et al. | 106/735 |
| 4,961,790 | 10/1990 | Smith et al. | 106/819 |

FOREIGN PATENT DOCUMENTS

| 0076927 | 4/1983 | European Pat. Off. . |
| 0508158A2 | 10/1992 | European Pat. Off. . |
| 2164957 | 7/1973 | Germany . |

OTHER PUBLICATIONS

Chemical Abstracts, vol. 106, No. 22, 1987, Abstract No. 181621d no month.
Chemical Abstracts, vol. 100, No. 2, 1983, Abstract No. 11845p no month.

Primary Examiner—Mark L. Bell
Assistant Examiner—Michael Marcheschi
Attorney, Agent, or Firm—Burns, Doane, Swecker & Mathis

[57] ABSTRACT

There is described a thixotroping and set accelerating additive for mixtures which contain as component a hydraulic binder and/or a latent-hydraulic binder and furthermore water and optionally also an aggregate and/or other additives. The inventive thixotroping and set accelerating additive consists of one or more esters of the carbonic acid or said additive is a mixture which has a pH-value of not more than 8.0, preferably not more than 7.5 and contains as component at least one of said carbonic acid esters.

Optionally the inventive additives can comprise further components which frequently are added to materials containing a hydraulic binder in order to improve the workability and/or the properties of the final building material, like concrete plasticizers, concrete super-plasticizers, set retarding agents, set accelerating agents, air entraining agents and optionally further thixotroping agents and mixtures of two or more such additives. The present invention furthermore concerns a mixture containing a hydraulic binder and the inventive additive and furthermore a process for preparing such a mixture and an apparatus for performing the process.

24 Claims, 1 Drawing Sheet

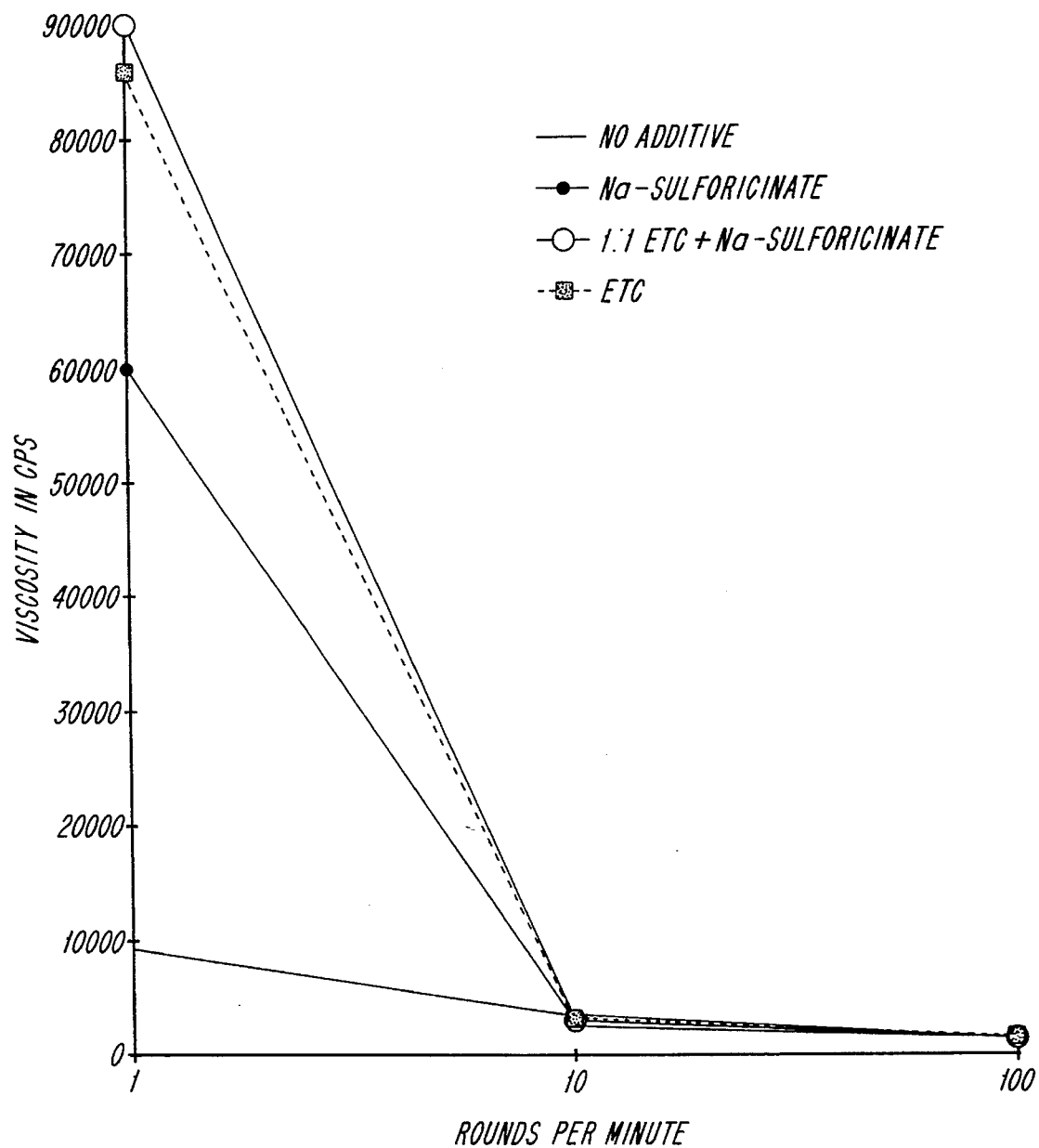

ial made of the mixtures is improved.
THIXOTROPING AND SET-ACCELERATING ADDITIVE FOR MIXTURES CONTAINING A HYDRAULIC BINDER, PROCESS USING THE ADDITIVE, APPARATUS FOR PREPARING THE MIXTURES CONTAINING A HYDRAULIC BINDER AS WELL AS THE ADDITIVE The present invention concerns a thixotroping and set-accelerating additive for mixtures which contain a hydraulic or latent-hydraulic binder. Through use of the additive the workability of the mixtures as well as the properties of the construction material made of the mixtures is improved.

Providing thixotropic properties to hydraulic and latent-hydraulic mixtures, like slurries of cement, mortar and concrete, is a process which is of economic importance and well established in the fields of underground working, mining and at construction sites.

It, however, is of great importance that the mixture which contains the additive gain the desired properties at the construction site, particularly the intended flowability and rigidity. Control of the development of compressive strength is thereby very important and the feature also influences the costs involved at the building site.

DESCRIPTION OF THE PRIOR ART

It is well known in the art to premix inorganic thixotroping agents which have the ability of reacting with each other or to prepare a premixture of cement slurries with additives, like alkali silicates, such as water glass, and to introduce those mixtures into cavities, for example by pumping. Corresponding processes are widely used in the field of mining and for cementing wells and bore-holes.

Corresponding processes are described, for example, in the following publications:

| U.S. Pat. No. | 3 498 809 |
| U.S. Pat. No. | 3 483 007 |
| U.S. Pat. No. | 4 470 463 |
| UK patent application Ser. No. | 2 058 037 A |
| UK patent application Ser. No. | 2 223 488 A |
| Japanese patent No. | 59 12 06 81 A2. |

Processes according to which there are introduced into the conveyor line or pipeline further additives, such as silicates or acrylates, are e.g. described in U.S. Pat. No. 3,672,173, in published European patent application 0 364 149 and in UK patent application 2 187 727. The incorporation of silicates, however, brings along the disadvantage that the construction material loses its flowability too fast and that the rigidity and compressive strength of the cured constructions material is decreased. The incorporation of acrylates and cellulose ethers, on the other hand, results in the disadvantage that they retard the curing process to a high extent.

All the above only refer to the use of the additives in mixtures which contain cement and water, but no aggregates at all.

In the U.S. Pat. No 4,983,218 there is described a process according to which the curing of alkali metal which are used in the field of the molds for die castings is accelerated through the addition of cyclic alkylene carbonates.

In Chemical Abstracts, volume 106, no. 22, 1987, abstract no. 181 621d, there is given an abstract of the Japanese patent application 61 247 648 of TOA GOSEI CHEMICAL INDUSTRY CO., LTD. The document discloses to use, as cement set accelerators mixtures comprising an alkali metal aluminate, an alkali metal carbonate and an organic compound which is hydrolyzable to an acid in alkaline media. Specifically there is described a set acclerator which is prepared by mixing an aqueous solution of potassium aluminate with an aqeuous solution of potassium carbonate and a small amount of ethylene carbonate. The aqueous solutions, however, are not storable because they have a high pH-value due to the presence of the alkali metal aluminates and carbonates, in which strongly alkaline pH-region the ethylene carbonate is decomposed rapidly. The instability of alkylene carbonates is, e.g. described in the book 25,135 named "Alkylene Carbonate of the Hüls Company", printed Jul. 1991, page 19.

A further disadvantage of set-accelerating additives described in the prior art is that they often cause problems in contaminating soil, air, water streams and ground water. Furthermore, they are detrimental to the health of the workers who use products because they can cause an etching of the skin, the eyes and the respiratory tract of the persons dealing with substances.

It, accordingly, was the object of the present invention to provide additives which have a thixotroping and set-accelerating effect on mixtures which contain hydraulic or latent-hydraulic binders, and through which additives the workability and/or the properties of the cured construction material are improved. The additives furthermore, should be storable for long periods and also avoid the environmental and health risks of the prior art additives.

BRIEF DESCRIPTION OF THE DRAWING

The FIGURE illustrates the viscosity values for certain exemplified cement pastes.

DESCRIPTION OF THE INVENTION

It was surprisingly that the above stated aims can be achieved with a thixotropic and set-accelerating additive for such mixtures which contain as components a hydraulic binder and/or a latent-hydraulic binder, which additive contains at least one ester of carbonic acid in a mixture having a pH-value of not more than 8.0, or which additive consists of at least such an ester of carbonic acid.

One object of the present invention, accordingly, is a thixotroping and set-accelerating additive for mixtures which contain, as component, a hydraulic binder and/or a latent-hydraulic binder, and which additive is characterized in that it contains one or more esters of carbonic acid or said additive is a mixture having a pH-value of not more than 8.0, which mixture contains at least one ester of carbonic acid.

The inventive thixotroping and set-accelerating additives can be added to mixtures which contain a hydraulic and/or latent-hydraulic binder and either no aggregate, or as further component, an aggregate, in order to improve the workabilty of the resulting mixtures and/or the properties of the construction material prepared from such mixtures.

Contrary to set-accelerating additives, and thixotroping additives which are described in the prior art, the inventive additives have the advantage that they are not toxic, have about a neutral pH value, and accordingly, do not cause health risks to the persons who produce and/or use the corresponding. mixtures. Furthermore, contrary to corresponding mixtures containing ethylene carbonates having an alkaline pH-value, like the corresponding set-accelerators described in the above mentioned Japanese patent 61 247

648, the inventive mixtures are storable for several months.

The at least one ester of carbonic acid which is contained in the inventive additives, furthermore, is biologically degradated rapidly when exposed to environmental conditions and, accordingly, no pollution of the soil, the air, the water streams and the ground water result through the use of the inventive additives, and furthermore the corresponding esters of carbonic acid do not adversely influence the purification of waste water which contains them.

Preferably, the ester of carbonic acid which is contained in the inventive additive or constitutes the inventive additive, is at least partially soluble in water or completely soluble in water. The corresponding ester of carbonic acid can be either a diester of the carbonic acid, a monoester of carbonic acid or a salt of a monoester of carbonic acid.

Preferred esters of the carbonic acid are unsubstituted or substituted aliphatic esters, unsubstituted or substituted aliphatic monoesters or salts of such monoesters. The corresponding esters of carbonic acid, furthermore, can have either an open chained structure or a cyclic structure.

Specially preferred esters of carbonic acid, which constitute the inventive thixotropic and set-accelerating additive, or which are a component of corresponding additives, are cyclic aliphatic di-esters. Preferred of such diesters are the 1,3-dioxolan-2-one and the 4-methyl-1,3-dioxolan-2-one and mixtures thereof. A preferred example of an open chained aliphatic diester of carbonic acid is tert.-butyl carbonate.

Preferred examples of monoesters of carbonic acid are corresponding monoalkyl carbonates and salts thereof, like e.g. mono-tert.butyl carbonate and monomethyl carbonate, as well as salts thereof, like e.g., the alkali metal salts, preferably sodium salts and potassium salts of the above stated monoalkyl carbonates.

Inventive additives which are mixtures containing at least one ester of carbonic acid and at least one additional component, preferably have a pH-value of not more than 7, specially preferred about a neutral to slightly acidic pH-value.

The at least one further component which is contained in the corresponding inventive additives is preferably is either water or a component which improves the workability and/or the properties of the construction material which is prepared by adding the inventive additive to a corresponding mixture which contains at least one hydraulic binder and/or latent-hydraulic binder. Preferred examples of such further components which are optionally present in inventive additives which constitute mixtures, are selected from the group which consists of:

one or more concrete plasticizers, (also known as water reducing agents), one or more concrete superplasticizers, (also known as high range water reducing agents)

one or more set retarding agents, one or more thixotroping agents, one or more set-accelerating agents, one or more air-entraining agents and mixtures comprising two or more of the above stated components.

Concrete plasticizers are added to mixtures which contain a hydraulic binder, like e.g. cement, for many years in order to improve the flowability of the corresponding mixture which contains as a further component water. This is also the reason why the additives are named water reducing agents, because through the addition of the component there can be achieved a good flow-ability of such mixtures which have a low water content (low water to cement ratio).

Preferably the concrete plasticizers and/or concrete superplasticizers which are present as a further component in the inventive additives, are selected from the group consisting of:

carbohydrate-lignosulfonate derivatives, sulfonated melamine formaldehyde condensates, naphthalene sulfonate formaldehyde condensates, sulfonated vinyl copolymeres, acryl copolymeres and modified ligno-sulfonates.

It is furthermore well known in the art to incorporate into mixtures which contain a hydraulic binder and/or a latent-hydraulic binder, and optionally further components, like aggregate, a set-retardening agent and furthermore a set-accelerating agent in order to improve the workability of the mixture, in order to control the set procedure and/or in order to improve the properties of the finally cured construction material. The set accelerating components can be added to mixtures containing an inorganic binder and furthermore a set-retarder. How ever if desired, set retarders and set accelerating agents can be also added at the same time or as mixtures.

If the inventive additive contains further component a set-retarder, or two or more different set-retarders, then the retarders are preferably selected from the group consisting of the following materials:

condensed phosphates, polyphosphates, hexametaphosphates, phosphonic acid derivatives, salts of hydroxy and/or polyhydroxy carboxylic acids, preferably salts of $\alpha$-hydroxy acetic acid, citric acid, gluconic acid and glucoheptonic as well as partially hydrolized starch and/or carbohydrates.

As already outlined above, the inventive additives have a thixotroping effect if incorporated into a mixture which contains a component a hydraulic binder and/or a latent-hydraulic binder. If desired, however, the inventive additives can contain as a further component at least one thixotroping agent. Preferably, thixotroping agents are selected from the group which consists of swellable cellulose ethers, sulphonated gylcerides of the oleic acid, linolic acid, palmitic acid, stearic acid and ricinoleic acid and furthermore silicasols.

The inventive additives act as set-accelerators if added to corresponding mixtures which contain as a component at least one hydraulic binder and/or latent-hydraulic binder. Nevertheless, however, the inventive additives optionally contain as a further component a set-accelerator which is selected from the set-accelerators well known in the art, provided that said the set-accelerator does not have alkaline properties in order to provide a mixture having a pH-value of not more than 8.0.

Preferred set-accelerators which are optionally present as a further component, are therefore selected from the group of amorphous silicon dioxide and amorphous aluminum hydroxide.

If desired, the inventive additive can contain as a further component an air entraining agent and preferably the air entraining agent is selected from such agents which contain metallic aluminum.

The inventive additive preferably is present in the form of one more aqueous solutions or emulsions or dispersions.

A further object of the present invention is a process which uses the inventive additive and which is characterized in that the thixotropic and set-accelerating additive is added to a mixture which contains as component a hydraulic and/or a latent-hydraulic binder and that the corresponding mixture to which the additive is added, contains as a further component, water and/or an aggregate.

According to a preferred embodiment the inventive additive or at least one component thereof is added to the mixture which contains the hydraulic binder either in a mixing device, or after the mixing procedure in the conveyer line or pipeline, or near to the part thereof which is equipped with the and wherein the introduction of the additive is performed using mixing tubes or a mixing device.

If the introduction of the additive is performed formed using mixing tubes then the tubes can e.g., be ring nozzles or spray nozzles or venturi-tubes. If the mixing device is a static mixer, then the mixer is preferably equipped with one or more dosing units.

According to a preferred embodiment the inventive additive is added in such an amount that 0.1–10% by weight is introduced, based on the weight of the binder which is present in the corresponding mixture which contains as a component the hydraulic binder and/or the latent-hydraulic binder.

If there is used an inventive additive which contains as a further component a plasticizer and/or a super-plasticizer, then it is preferred to add the additive in such an amount that the plasticizer and/or is introduced into the mixture which contains the hydraulic binder and/or latent-hydraulic binder in such an amount that the plasticizer and/or super-plasticizer is present in the corresponding final mixture in an amount of 0.2–5% by weight based on to the weight of the binder.

Inventive additives which contain as a further component a set retarder are usually incorporated into the mixture which contains the hydraulic binder and/or latent-hydraulic binder in such an amount that the set retarder is incorporated into the mixture in a quantity of 0.01–5% by weight, based on the weight of the hydraulic binder which is present in the mixture. Preferred set retardening agents used in the process were mentioned before.

Inventive additives which contain as a further component a thixotroping agent, usually one of the preferred thixotroping agents which were mentioned before, are advantageously incorporated into the mixture containing the hydraulic binder or latent-hydraulic binder so that in the final mixture the corresponding thixotroping agent is present in an amount of 0.01–10% by weight, to the weight of the hydraulic binder present in the final mixture, e.g. based on to the weight of the cement.

Inventive additives which contain as further component an air entraining agent, preferably one of the preferred air entraining agents mentioned before, are usually incorporated into the mixture containing the hydraulic binder and/or latent hydraulic binder, in such an amount that the air entraining agent is present in the final mixture, in a quantity of 0.01–5% by weight, based on the weight of the binding agent.

A further object of the present invention is an apparatus for the performance of the inventive process which is characterized in that in the line through which the mixture is pumped, there are present one or more sections which are equipped with one or more mixing tubes.

A still further object of the present invention is a mixture which contains a hydraulic binder and/or a latent-hydraulic binder and at least one further component which is selected from water and aggregate and which mixture is characterized in that it comprises as a further component an inventive additive, i.e. at least one ester of carbonic acid.

Preferably the corresponding mixtures contain one of the before mentioned specially preferred inventive additives.

Preferred hydraulic binders which are present in the inventive mixtures are hydraulic binders which are selected from the group consisting of cement, Portland cement, blast-furnace-slag-cement, fly ash, puzzolanes, burnt clay cement, oil-shale cement, white cement and/or burnt oil-shale.

Preferred latent-hydraulic binders which are present in the inventive mixtures are selected from the group which consists of fly ash, slags, puzzolanes, silica fume or mixtures of two or more such components. The corresponding mixtures preferably contain as a further component aggregates and the corresponding aggregates either have certain particle sizes or are mixtures comprising different particle sizes which are selected from the group consisting of sands and gravel, specially such products which have particle sizes in the range of 0–32 mm.

The inventive additives can either be only one component or be a mixture of two or more components provided that the corresponding mixture has a pH-value of not more than 8.0. If the inventive additives contain several components then it is possible to add the different components of the additive to the mixture containing the binding agent at different stages during the mixing procedure, e.g. in different regions of the pipe or the line. Provided that if the final mixture to be prepared is spray concrete then it is also possible to add the inventive additives immediately before or in the spraying nozzle.

The present invention will be further illustrated through the following examples which, however, must not be considered as being limitative. In the examples, all the percentages stated therein refer to the weight of the hydraulic binder and/or latent-hydraulic binder which is present in the final mixture.

EXAMPLE 1

In said example an inventive additive was tested which consisted of the cyclic carbonic ester 1,3-dioxolane-2-one. Said cyclic carbonate was added to a paste, which after the addition of said ester of the carbonic acid had the following composition:

200 g burnt oil shale 4 g melamine superplasticizer

72–90 g water

0–4 % 1,3-dioxolane-2-one.

The used super-plasticizer was the product sold under the trademark "Sikament FF-86"by Sika Company.

The curing time was determined according to the method DIN 1164 using the VICAT method.

| 1,3-dioxolane-2-one | water (g) | beginning of setting | setting |
| --- | --- | --- | --- |
| 0% | 90 | 6 h. 30 min. | 8 h. |
| 2% | 86 | 45 min. | 2 h. 5 min. |
| 2.5% | 85 | 2 min. 10 sec. | 19 min. |
| 4% | 82 | 1 min. | 2 min. 45 sec. |
| 4% | 72 | 30 sec. | 1 min. 15 sec. |

EXAMPLE 2

In the present example the thixotroping effect of the 1,3-dioxolane-2-one was compared with the thixotroping effect of a thixotroping agent available in the market which is a product based on sulfonated castor oil. Furthermore, in said example also an 1:1 mixture of 1,3-dioxolane-2-one plus the sulfonated castor oil was tested.

Said tests were performed with a cement containing paste which had the following composition:

2000 g Portland cement 800 g water 50 g additive

The corresponding mixture was stirred for 10 minutes and then its consistency was determined using a Brookfield rotational viscosimeter which was equipped with a spindle no. 4.

The corresponding test results are given in the table below.

| additive | concentration in % | 100 rpm | 10 rpm | 1 rpm |
| --- | --- | --- | --- | --- |
| sodium-sulforicinate | 2.5 | 1'100 | 2'400 | 60'000 |
| 1:1 mixture of sodium-sulforicinate + 1,3-dioxolane-2-one | 2.5 | 1'100 | 3'000 | 90'000 |
| 1,3-dioxolane-2-one | 2.5 | 1'200 | 3'200 | 86'000 |
| none | 0 | 900 | 3'400 | 9'000 |

EXAMPLE 3

In said example the influence of the inventive additive 1,3-dioxolane-2-one onto the curing time of a cement paste was compared with the corresponding influence of a thixotroping agent available in the market on the basis of a sulfonated castor oil. Furthermore, also tests were performed with a 1:1 mixture of 1,3-dioxolane-2-one with the sulfonated castor oil.

The tested cement paste had the following composition:

2000 g Portland cement 800 g water and 50 g additive.

The mixture was stirred for 10 minutes.

The test results are stated in the table given below:

| additive | concentration in % | start of setting | final setting |
| --- | --- | --- | --- |
| none | 0 | 7 h. 40 min. | 9 h. 25 min. |
| sodium-sulforicinate | 2.5 | 24 h. | 28 h. |
| 1:1 mixture of sodium-sulforicinate + 1,3-dioxolane-2-one | 2.5 | 6 h. 40 min. | 8 h. 50 min. |
| 1,3-dioxolane-2-one | 2.5 | 2 h. 50 min. | 4 h. 30 min. |

There can be seen from the above table that the prior art thixotroping agent based on the sodium salt of castor oil have a set retardening activity (the starting of the setting and also the final set is far longer than in the sample where no additive at all had been added).Contrary to this, the inventive additive, i.e. the 1,3-dioxolane-2-one results in an acceleration of the starting of the setting and the final setting or curing if compared with the mixture which did not contain any additive at all.

EXAMPLE 4

The setting time of a cement containt paste was determined according to the Vicat-method.

The tested cement paste had the following composition:

2000 cement 860 g water and

0–80 g of an additive.

The tested additive was the 1,3-dioxolane-2 one. The mixture was stirred for 10 minutes.

| additive | concentration in % | start of setting | final setting |
| --- | --- | --- | --- |
| none | 0 | 5 h. 35 min. | 7 h. 50 min. |
| 1,3-dioxolane-2-one | 1 | 4 h. | 6 h. |
| 1,3-dioxolane-2-one | 2 | 3 h. 30 min. | 5 h. 30 min. |
| 1,3-dioxolane-2-one | 3 | 3 h. | 5 h. |
| 1,3-dioxolane-2-one | 4 | 2 h. | 4 h. 25 min. |

Furthermore the setting time was tested according to the Vicat-method using a cement paste which contained as further additive a superplasticizer based on a modified melamine-formaldehyde-condensate, i.e. the corresponding product of Sika Company which is available in the market with the designation "Sikament 300".

The corresponding cement paste had the following composition:

2000 g cement 800 g water 20 g Sikament 300

0–80 g additive

The used additive was 1,3-dioxolane-2-one and the corresponding mixture was stirred for 3 minutes. The test results are stated in the table below:

| additive | concentration in % | start of setting | final setting |
| --- | --- | --- | --- |
| none | 0 | 10 h 5 min. | 11 h. 55 min. |
| 1,3-dioxolane-2-one | 2 | 2 h. 30 min. | 4 h. 30 min. |
| 1,3-dioxolane-2-one | 3 | 30 min. | 1 h. 25 min. |
| 1,3-dioxolane-2-one | 4 | 25 min. | 1 h. 10 min. |

EXAMPLE 5

In the present example the thixotroping effect of different esters of the carbonic acid was tested. The cement paste used for performing said tests had the following composition:

2000 g Portland cement 800 g water and 50 g of the ester of the carbonic acid.

The corresponding mixtures were stirred for ten minutes after the ester of the carbonic acid had already been added. The only exception is the test indicated with an asterix in the following table. In said table the ethylene carbonate, i.e. the 1,3-dioxolane2-one was added and the thixotropy already determined two minutes after said addition. The corresponding determined value was arbitrarily given the value of 100% and this was the standard value for all the other tests.

| added ester of the carbonic acid | concentration in % | relative thixotropy |
|---|---|---|
| none | 0 | 0% |
| *standard ethylene carbonate, 2 min., | 2.5 | 100% |
| ethylene carbonate | 2.5 | 80% |
| potassium salt of the mono-tertiary butyl-carbonate | 2.5 | 90% |
| sodium salt of the mono-methylcarbonate | 2.5 | 50% |

EXAMPLE 6

In said example the setting time of several cement pastes were determined which contained as additive the different esters of the carbonic acid indicated in said table.

The corresponding cement paste had the following composition:

2000 g Portland cement
800 g water and
50 g of the ester of the carbonic acid.

The corresponding mixtures were stirred for ten minutes.

| additive | concentration in % | start of setting | final setting |
|---|---|---|---|
| none | 0 | 3 h. 30 min. | 8 h. |
| ethylene carbonate | 2.5 | 1 h. 30 min. | 5 h. |
| potassium salt of mono-tertiary butyl-carbonate | 2.5 | 2 h. 40 min. | 6 h. 30 min. |
| sodium salt of mono-methylcarbonate | 2.5 | 2 h. 30 min. | 6 h. 50 min. |

In the figure the results of the development of the viscosity of cement pastes, depending on the applied shear was tested. The cement pastes have a water-to-cement ratio of 0.4.

ETC means ethylene carbonate.

We claim:

1. A thixotroping and set-accelerating additive for mixtures which contain, as a component, a hydraulic binder and/or a latent-hydraulic binder, said additive comprising an additive mixture having a pH-value of not more than 8.0 including (i) at least one thixotroping and set-accelerating ester of carbonic acid which is at least partially soluble in water, and (ii) an additional component selected from the group consisting of a concrete plasticizer, a concrete superplasticizer, a set-retarding agent, a thixotroping agent other than an ester of carbonic acid, a set-accelerating agent other than an ester of carbonic acid, an air-entraining agent, and mixtures thereof.

2. An additive according to claim 1, wherein the ester of carbonic acid comprises a diester of carbonic acid, a monoester of carbonic acid or a salt of a monoester of carbonic acid.

3. An additive according to claim 2, wherein the ester of carbonic acid is an unsubstituted or substituted aliphatic diester, a monoester or salt of a monoester, which ester has an open-chain structure or a cyclic structure.

4. An additive according to claim 3, wherein the aliphatic ester of carbonic acid is a diester which is selected from the group consisting of the cyclic diesters 1,3-dioxolan-2-one and 4-methyl-1,3-dioxolan-2-one, open-chained diester tert-butyl carbonate and a monoester which is monomethyl carbonate or a salt thereof.

5. An additive according to claim 1, wherein the additive mixture has a pH-value of not more than 7.5.

6. An additive according to claim 1 in the form of one or more aqueous solutions or emulsions or dispersions.

7. An additive according to claim 1 wherein the concrete plasticizer and/or concrete superplasticizer comprises carbohydrate-lignosulfonate derivatives, sulfonated melamine formaldehyde condensates, naphthalene sulfonate formaldehyde condensates, sulfonated vinyl copolymers, acryl copolymers or modified ligno-sulfonates.

8. An additive according to claim 1 wherein the set-retarder comprises condensed phosphates, polyphosphates, hexametaphosphates, phosphonic acid derivatives, salts of hydroxy or polyhydroxy carboxylic acids.

9. An additive according to claim 1, wherein the set-retarder is selected from the group consisting of salts of α-hydroxy acetic acid, citric acid, gluconic acid and gluco-heptonic acid, and partially hydrolized starch and carbohydrates.

10. An additive according to claim 1 wherein the thixotroping agent according to (ii) is selected from the group consisting of swellable cellulose ethers, sulphonated glycerides of oleic acid, linolic acid, palmitic acid, stearic acid and ricinoleic acid and silica sols.

11. An additive according to claim 1 wherein the set-accelerating agent according to (ii) is selected from the group consisting of amorphous silicon dioxide and amorphous aluminum hydroxide.

12. An additive according to claim 1, wherein the air entraining agent is metallic aluminum.

13. A mixture comprising at least one of a hydraulic binder and a latent-hydraulic binder, and at least one of water and an aggregate, and further comprising a thixotroping and set-accelerating additive comprising at least one thixotroping and set-accelerating ester of carbonic acid which is at least partially soluble in water, or an additive mixture having a pH-value of not more than 8.0 prior to combination with the other components of the mixture, and comprising at least one thixotroping and set-accelerating ester of carbonic acid which is at least partially soluble in water.

14. A mixture according to claim 13, wherein the hydraulic binder is selected from the group consisting of cement, pozzolans, burnt oil-shale, and mixtures thereof.

15. A mixture according to claim 13, wherein the latent-hydraulic binder is pozzolans.

16. A mixture according to claim 13, wherein the aggregate is a single aggregate or mixture of aggregates and is selected from the group consisting of sands and gravels having particle sizes in the range of up to 32 mm.

17. A mixture according to claim 13, wherein said additive is an additive mixture of at least (i) one or more esters of carbonic acid at least partially soluble in water, and (ii) an additional component selected from the group consisting of a concrete plasticizer, a concrete superplasticizer, a set-retarding agent, a thixotroping agent other than an ester of carbonic acid, a set-accelerating agent other than an ester of carbonic acid, an air-entraining agent, and mixtures thereof.

18. A mixture according to claim 13, wherein the ester of carbonic acid comprises a diester of carbonic acid, a monoester of carbonic acid or a salt of a monoester of carbonic acid.

19. A mixture according to claim 18, wherein the ester of carbonic acid is an unsubstituted or substituted aliphatic diester, a monoester or salt of a monoester, which ester has an open-chain structure or a cyclic structure.

20. A mixture according to claim 19, wherein the aliphatic ester of carbonic acid is a diester which is selected from the group consisting of the cyclic diesters 1,3-dioxolan-2-one and 4-methyl-1,3-dioxolan-2-one, or open-chained diester tert-butyl carbonate and a monoester which is monomethyl carbonate or a salt thereof.

21. A mixture according to claim 13, wherein the additive mixture has a pH-value of not more than 7.5 prior to combination with the other components of the mixture.

22. A mixture according to claim 13 in the form of one or more aqueous solutions or emulsions or dispersions.

23. The mixture according to claim 14, wherein the cement comprises Portland cement, blast-furnace-slag cement, burnt clay cement, oil-shale cement, white cement or mixtures thereof and the pozzolan is fly ash.

24. The mixture according to claim 15, wherein the pozzolan comprises fly ash, slags, silica fume or mixtures thereof.

* * * * *